(12) United States Patent
Volk

(10) Patent No.: US 10,408,597 B2
(45) Date of Patent: Sep. 10, 2019

(54) MEASURING ASSEMBLY

(71) Applicant: JENOPTIK Industrial Metrology Germany GmbH, Villingen-Schwenningen (DE)

(72) Inventor: Raimund Volk, Villingen-Schwenningen (DE)

(73) Assignee: JENOPTIK Industrial Metrology Germany GmbH, Villingen-Schwenningen (DE)

( * ) Notice: Subject to any disclaimer, the term of this patent is extended or adjusted under 35 U.S.C. 154(b) by 208 days.

(21) Appl. No.: 15/486,038

(22) Filed: Apr. 12, 2017

(65) Prior Publication Data
US 2017/0336189 A1 Nov. 23, 2017

(30) Foreign Application Priority Data

Apr. 18, 2016 (DE) .................. 10 2016 107 135

(51) Int. Cl.
*G01B 5/20* (2006.01)
*G01B 21/20* (2006.01)
(Continued)

(52) U.S. Cl.
CPC .............. *G01B 5/20* (2013.01); *G01B 5/003* (2013.01); *G01B 5/201* (2013.01); *G01B 21/20* (2013.01); *G01B 5/004* (2013.01); *G01B 5/28* (2013.01)

(58) Field of Classification Search
CPC ................................. G01B 5/20; G01B 21/20
(Continued)

(56) References Cited

U.S. PATENT DOCUMENTS 3,125,811 A * 3/1964 Pierce et al. ......... G01B 5/0004
269/60
4,662,074 A * 5/1987 Knapp .................. G01B 7/004
33/546
(Continued)

FOREIGN PATENT DOCUMENTS

DE 23 33 502 A1 1/1975
DE 43 36 267 A1 4/1995
(Continued)

OTHER PUBLICATIONS

German Office Action, dated Dec. 22, 2016, in parent application DE 10 2016 107 135.8, filed Apr. 18, 2016 (5 pages).

*Primary Examiner* — Christopher W Fulton
(74) *Attorney, Agent, or Firm* — Shlesinger, Arkwright & Garvey LLP

(57) ABSTRACT

A measuring assembly for measuring the contour of a workpiece has a measuring probe that is pivotably supported and deflectable about a first axis (measuring axis) in order to contact a surface of the workpiece, and has a second axis that is associated with the workpiece. The first axis and the second axis are parallel or approximately parallel to one another for radially contacting a surface of the workpiece. A device for rotating the measuring probe and the workpiece relative to one another is provided, such that the measuring probe contacts the surface of the workpiece during the rotation, and a device for plotting the angular deflection of the measuring probe as a function of the particular rotational position of the workpiece relative to the measuring probe is provided.

10 Claims, 2 Drawing Sheets

(51) Int. Cl.
  *G01B 5/00* (2006.01)
  *G01B 5/004* (2006.01)
  *G01B 5/28* (2006.01)

(58) Field of Classification Search
  USPC .................................. 33/551, 553, 554, 555
  See application file for complete search history.

(56) References Cited

U.S. PATENT DOCUMENTS

| | | | | |
|---|---|---|---|---|
| 5,131,166 A | * | 7/1992 | Weber | G01B 5/004 |
| | | | | 33/1 M |
| 5,359,784 A | * | 11/1994 | Tomida | G01B 5/201 |
| | | | | 33/520 |
| 5,778,549 A | * | 7/1998 | Campanile | G01B 21/045 |
| | | | | 33/503 |
| 6,327,788 B1 | * | 12/2001 | Seddon | G01B 5/201 |
| | | | | 33/543 |
| 6,354,012 B1 | * | 3/2002 | Pettersson | G01B 7/008 |
| | | | | 33/503 |
| 6,490,912 B1 | | 12/2002 | Volk | |
| 6,564,466 B2 | * | 5/2003 | Uwai | G01B 5/20 |
| | | | | 33/549 |
| 7,290,348 B2 | * | 11/2007 | Katamachi | G01B 5/0016 |
| | | | | 33/550 |
| 8,334,971 B2 | | 12/2012 | Keller et al. | |
| 8,336,223 B2 | * | 12/2012 | Nakayama | G01B 21/047 |
| | | | | 33/503 |
| 8,336,224 B2 | | 12/2012 | Arnold | |
| 8,429,829 B2 | | 4/2013 | Arnold | |
| 8,508,743 B2 | | 8/2013 | Keller et al. | |
| 8,725,446 B2 | | 5/2014 | Wegmann | |
| 8,949,071 B2 | * | 2/2015 | Takanashi | G01B 5/201 |
| | | | | 33/502 |
| 8,973,280 B2 | | 3/2015 | Seewig | |
| 9,261,359 B2 | | 2/2016 | DeCool | |
| 9,393,663 B2 | | 7/2016 | Volk | |
| 9,395,310 B2 | | 7/2016 | Rudolf | |
| 9,562,756 B2 | | 2/2017 | Seewig | |
| 9,568,298 B2 | * | 2/2017 | Senn | G01B 5/08 |
| 9,683,914 B2 | | 6/2017 | Dietz et al. | |
| 9,816,811 B2 | | 11/2017 | Riester | |
| 9,879,969 B2 | | 1/2018 | Volk | |
| 9,983,149 B2 | | 5/2018 | Rudolf | |
| 2008/0083126 A1 | | 4/2008 | Pommer | |
| 2011/0088273 A1 | | 4/2011 | Yamamoto et al. | |
| 2016/0195389 A1 | * | 7/2016 | Sagemueller | G01B 21/045 |
| | | | | 33/503 |

FOREIGN PATENT DOCUMENTS

| | | |
|---|---|---|
| DE | 10 2004 058 657 A1 | 6/2006 |
| EP | 787 280 | 1/2004 |

* cited by examiner

MEASURING ASSEMBLY

CROSS-REFERENCE TO RELATED APPLICATIONS

This application claims the priority of German Application No. DE 10 2016 107 135.8, filed Apr. 18, 2016, and which is incorporated herein by reference.

Field of the Invention

The invention relates to a measuring assembly for measuring the contour of a workpiece. More particularly, the invention relates to a measuring assembly for measuring the contour of a workpiece having a measuring probe that is pivotably supported and deflectable about a first axis (measuring axis) in order to contact a surface of the workpiece.

Background of the Invention

Measuring assemblies of this type are generally known. They have a measuring probe, which is pivotably supported and deflectable about a first axis (measuring axis), for contacting a surface of the workpiece, and a second axis associated with the workpiece.

Such measuring devices, having a rotating measuring axis, used in such measuring assemblies are primarily designed for determining the roundness of a substantially rotationally symmetrical measuring point of a workpiece are generally known. In this regard, probes are used which have a relatively high resolution in a range of approximately 10 nm, but which generally are not suitable for determining the circumferential contour of a workpiece.

In order to use such roundness measuring devices for measuring the contour of a workpiece, the precise geometry of the probe, in particular with regard to the radius of the probe arm and its normal position, must be known. Since for the necessary and convenient reaching of measuring points that are difficult to access, for example the normal position of the probe arm of such probes may be adjusted with respect to the action of a slip clutch by simple "bending," long-term use of the determined geometry data is not ensured. In addition, no methods exist with which the geometry may be determined with high accuracy.

During the measurement of the roundness of a rotationally symmetrical workpiece, it is necessary to align the rotational axis of symmetry of the workpiece with respect to the rotational axis; in the known measuring assemblies, the first axis extends perpendicularly with respect to the second axis. When there is no alignment or the alignment is insufficient, eccentricity and wobbling movements occur which result in systematic measuring errors. In addition, under some circumstances the possible probe stroke of the measuring probe may be exceeded. Thus, the alignment of the axes with respect to one another is of great importance with regard to the measuring accuracy. The required alignment operation is time-consuming, in particular for relatively small workpieces, for example camshafts, and is therefore costly.

An error due to the lack of a perpendicular orientation of the measuring axis of the probe (first axis) with respect to the rotational axis (second axis) results in a characteristic error structure in the plotted circular profile. The shape of this systematic deviation is also referred to as a limacon.

A method for eliminating the limacon error from the plotted circular profile is known from EP 787 280 B1.

To simplify the measurement of the contour of a workpiece, it is known to contact the workpiece perpendicularly with respect to its surface, using the measuring probe. For this purpose, however, the contour of the workpiece must be known before starting the measurement, which represents a contradiction, since it is precisely this contour that is to be determined by the measurement in the first place. Instead of the actual contour of the workpiece, its nominal contour, for example from a CAD drawing, may be used. However, the appropriate data are often not available. In addition, the actual contour of the workpiece to be determined in the measurement deviates from the nominal contour, which for this very reason makes the measurement necessary.

Perpendicular contacting along a linear axis may be achieved by means of linear guiding, for example. However, it is disadvantageous that linear axes having the necessary linearity and vibration-free operation are more challenging to produce and therefore costlier to manufacture, compared to pivot lever systems.

OBJECTS AND SUMMARY OF THE INVENTION

An object of the invention is to provide a measuring assembly, which with a simple design, allows measurement of the contour of a workpiece with high accuracy.

This object is achieved by the invention set forth herein.

The basic concept of the invention lies in radially contacting, relative to the second axis, the surface of the workpiece whose contour is to be measured, using a measuring probe designed as a pivot lever probe, which in particular may be formed by the rotational axis of symmetry of the workpiece, in that the first axis (measuring axis) is situated in parallel or approximately parallel to the second axis. The contacting is achieved by rotating the measuring probe and the workpiece relative to one another. For example and in particular, during the measurement the measuring axis may be stationary and the workpiece may be rotated about the second axis. During the contacting of the workpiece, the angular deflection of the measuring probe about the measuring axis is plotted as a function of the rotational position of the workpiece relative to the measuring probe. The contour of the workpiece may then be reconstructed based on the measured values thus obtained. Appropriate reconstruction methods are generally known to those skilled in the art, and therefore are not explained here in greater detail.

One particular advantage of the measuring assembly according to the invention is that high measuring accuracy may be achieved, even with reduced requirements for precision of the measuring axes typically used.

Another advantage is that the measuring assembly according to the invention is insensitive to misalignments of the first axis and the second axis relative to one another. The aligning of the axes relative to one another may thus be simplified and shortened without significantly impairing the measuring accuracy. This reduces the overall duration of the measuring operation, and thus saves on costs. In addition, in the event of a complete or predominant lack of alignment of the axes relative to one another, measuring results may be achieved with the measuring assembly according to the invention which meet the requirements in most cases.

A further advantage of the measuring assembly according to the invention is that suitable pivot lever probes have high measuring accuracy and a large measuring range as well as a high resolution, but at the same time are inexpensive to manufacture. Another advantage of such pivot lever probes is that the risk of damage in the event of a collision with the workpiece is significantly lower than with measuring probes that contact along a linear axis.

The measuring assembly according to the invention provides a high level of flexibility when carrying out measurements, and due to the use of a tactile measuring probe is insensitive to minor impurities on the surface of the workpiece to be measured.

The mechanical surface of the workpiece is reconstructed, based on the measured values (plotted rough profile) obtained using the measuring assembly according to the invention, by reconstruction by means of a morphological mathematical operation. Parameters of the workpiece, for example cam shape, circle radii, roundness, angle, and spacings of the workpiece may then be computed in a known manner from the obtained profile sections.

The measuring assembly according to the invention is suitable for carrying out a variety of measuring tasks on different workpieces. The measuring assembly according to the invention is particularly well suited for measuring long shafts, camshafts in which the cam contour, waviness, and roughness may be measured with high precision, and crankshafts (main bearings and lift bearings). In addition, the measuring assembly according to the invention is also suitable for measuring sensitive surfaces, since on account of the low measuring force required for a corresponding pivot lever probe there is little risk of damage.

According to the invention, it is possible to rotate the measuring probe during the measuring operation with the workpiece stationary. It is also possible according to the invention to rotate both the measuring probe and the workpiece during the measuring operation. In terms of a simple design, one advantageous refinement of the invention provides that a rotary drive is associated with the workpiece in order to rotate the workpiece about the second axis during the measurement. In this embodiment, the measuring axis of the measuring probe thus remains stationary during the measurement, while the workpiece is rotated about the second axis.

One advantageous refinement of the above-mentioned embodiment provides that the rotary drive is in drive connection with a holding device for holding the workpiece during the measurement. In this embodiment, the workpiece is held by the holding device, which is rotated relative to the measuring probe during the measurement by means of the rotary drive.

In the above-mentioned embodiment, the holding device advantageously includes a clamping device for clamping the workpiece, as this provides an advantageous refinement. In this embodiment, the workpiece is clamped by means of the clamping device during the measurement, whereby the clamping device may have a headstock and a tailstock, for example.

According to another advantageous refinement of the invention, the measuring probe includes a pivot lever that is pivotably supported about the first axis, and on whose free end a probe element is situated.

In the above-mentioned embodiment, the shape, size, and configuration of the probe element are selectable within a wide range, depending on the particular requirements. In this regard, one advantageous refinement of the invention provides that the probe element is a sphere, in particular a precision sphere, made of ruby, for example, or a cylinder whose axis of symmetry is perpendicular or approximately perpendicular to the first axis and the longitudinal direction of the pivot lever. A design of the probe element as a cylinder is advantageous in particular for measuring convex external shapes, for example cam profiles or lift bearings of crankshafts. The probe element may also be designed as an annular section or a "sickle." In this case, the probe element is made up of a section of a ring or a torus whose axis is perpendicular to the probe section plane. The ring radius of the probe element may be within the same range as for a precision sphere, for example 0.5 to 1.5 mm.

Another advantageous refinement of the invention provides that a digital angle measuring system for detecting the particular angular position of the measuring probe during the measurement is associated with the measuring probe. Such digital angle measuring systems allow detection of the angular position and angular deflection of the measuring probe with high accuracy.

According to another advantageous refinement of the invention, an adjustment device for adjusting the position of the measuring probe relative to the second axis, in particular for contacting the workpiece, is associated with the measuring probe. For conducting a measurement, the measuring probe is adjusted relative to the workpiece by means of the adjustment device in such a way that the measuring probe contacts the workpiece.

One advantageous refinement of the above-mentioned embodiment provides that the adjustment device includes a pivot device, associated with the first axis of the measuring probe, for pivoting the first axis by 90° or approximately 90° in such a way that in a first pivot position, the first axis and the second axis are parallel or approximately parallel to the radial contact with a surface of the workpiece, and in a second pivot position, the first axis is perpendicular or approximately perpendicular to the second axis in order to contact a surface of the workpiece facing in the direction of the second axis. In this embodiment, in the first pivot position the workpiece is radially contacted in the manner according to the invention so that appropriate measurements may be conducted on the workpiece. In contrast, in the second pivot position the workpiece is contacted axially relative to the second axis. Additional parameters of the workpiece, for example runout characteristics or the course of a spiral groove, may be determined in this way. Further measuring tasks may thus be carried out with the measuring assembly according to the invention.

This embodiment in combination with the following features has its own importance. That is, this embodiment in combination with a measuring assembly for measuring the contour of a workpiece including:

a) a measuring probe that is pivotably supported and deflectable about a first axis in order to contact a surface of the workpiece;

b) a second axis that is associated with the workpiece;

c) the first axis and the second axis are substantially parallel to one another for radially contacting a surface of the workpiece;

d) a means for rotating the measuring probe and the workpiece relative to one another are provided, such that the measuring probe contacts the surface of the workpiece during the rotation; and e) a means for plotting the angular deflection of the measuring probe as a function of the rotational position of the workpiece relative to the measuring probe is provided.

Therefore, the subject matter of the invention further relates to a measuring assembly for measuring the contour of a workpiece, having a measuring probe that is pivotably supported and deflectable about a first axis (measuring axis) in order to contact a surface of the workpiece, and having a second axis that is associated with the workpiece, wherein the first axis and the second axis are perpendicular or approximately perpendicular to one another for axially contacting a surface of the workpiece, means for rotating the measuring probe and the workpiece relative to one another are provided, such that the measuring probe contacts the surface of the workpiece during the rotation, and means for plotting the deflection of the measuring probe as a function of the particular rotational position of the workpiece relative to the measuring probe are provided. This embodiment of the invention may be refined as detailed below. Another advantageous refinement of the invention provides means for setting a probe force for contacting the workpiece, using the measuring probe.

According to another advantageous refinement of the invention, a measured value memory is provided for storing measured values that are formed by the angular deflection of the measuring probe as a function of the particular rotational position of the workpiece relative to the measuring probe, the memory being in data transmission connection with an evaluation device in order to reconstruct the contour of the workpiece from the stored measured values.

According to another advantageous refinement of the invention, a measuring assembly for measuring the contour of a workpiece includes:

a) a measuring probe is provided that is pivotably supported and deflectable about a first axis in order to contact a surface of the workpiece;

b) a second axis that is associated with the workpiece;

c) the first axis and the second axis are substantially parallel to one another for radially contacting a surface of the workpiece;

d) a rotary drive for rotating the measuring probe and the workpiece relative to one another, such that the measuring probe contacts the surface of the workpiece during the rotation; and e) a plotter is provided, the plotter plots the angular deflection of the measuring probe as a function of the rotational position of the workpiece relative to the measuring probe.

The measuring assembly may further include a rotary drive is associated with the workpiece in order to rotate the workpiece about the second axis during the measurement.

The measuring assembly may further include that the rotary drive is in drive connection with a holder which holds the workpiece during the measurement.

The measuring assembly may further include that the measuring assembly holder includes a clamp which clamps the workpiece.

The measuring assembly may further include that the measuring probe includes a pivot lever that is pivotably supported about the first axis and on whose free end a probe element is situated.

According to the invention, an approximately parallel or approximately perpendicular alignment of the axes with respect to one another is understood to mean that the axes are to be regarded as parallel or perpendicular within the scope of the desired measuring accuracy.

The invention is explained in greater detail below with reference to the appended, highly schematic drawings, which are reduced to the basic principle of the measuring assembly according to the invention, based on exemplary embodiments. All features described in the description, illustrated in the drawings, and described in the patent claims, alone or in any combination, constitute the subject matter of the present invention, regardless of their recapitulation in the patent claims, and regardless of their description, or illustration in the drawings.

Relative terms such as left, right, up, and down are for convenience only and are not intended to be limiting.

DETAILED DESCRIPTION OF THE INVENTION

Figure 1:
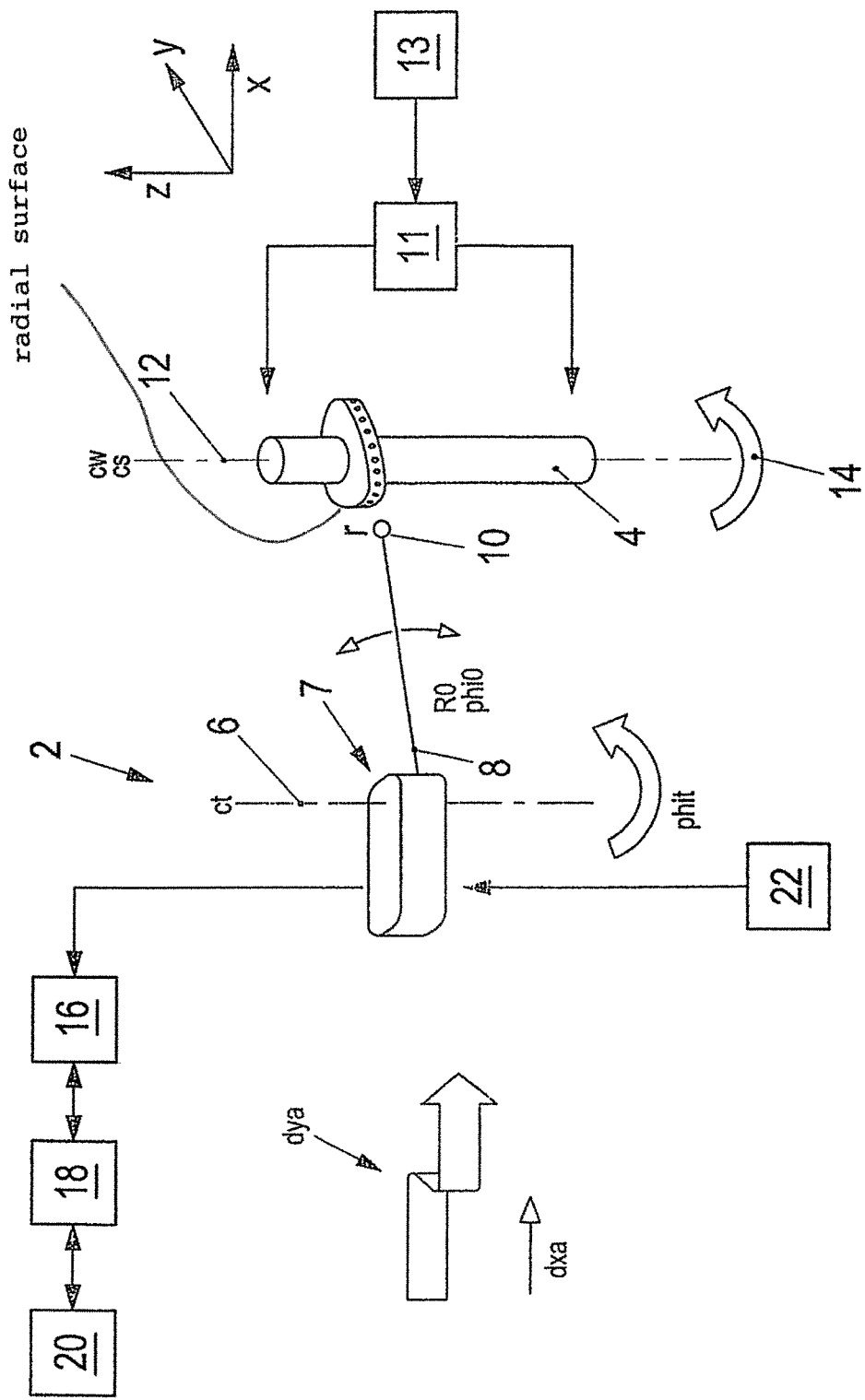
FIG. 1 shows a highly schematic illustration of a first exemplary embodiment of a measuring assembly according to the invention.

FIG. 1 shows a highly schematic illustration of a first exemplary embodiment of a measuring assembly 2 according to the invention for measuring the contour of a workpiece 4, merely schematically indicated, in the form of a shaft.

The measuring assembly 2 includes a measuring probe 7 which is pivotably supported and deflectable about a first axis 6 that extends in the plane of the drawing in FIG. 1, and which has a pivot lever 8 on the free end of which a probe element 10 is situated, which in the present exemplary embodiment is formed by a precision sphere. A second axis 12 is associated with the workpiece 4.

According to the invention, the first axis 6 and the second axis 12 are parallel, so that the measuring probe 7 radially contacts a surface of the workpiece 4 to be measured, as is apparent from FIG. 1.

According to the invention, means for rotating the measuring probe 7 and the workpiece 4 relative to one another are provided, such that the measuring probe 7 with its probe element 10 contacts the surface of the workpiece 4 during the rotation.

According to the invention, in addition means for plotting the particular deflection of the measuring probe 7 as a function of the rotational position of the workpiece 4 relative to the measuring probe 7 are provided.

In the illustrated exemplary embodiment, a holding device for holding the workpiece 4 during the measurement is provided, the holding device including a clamping device 11 for clamping the workpiece 4. Since FIG. 1 is strictly a schematic illustration, the clamping device 11 in FIG. 1 is merely schematically indicated. A rotary drive 13 is associated with the workpiece 4 in order to rotate the workpiece 4 about the second axis 12; since the drawing is reduced to the basic principle, the rotary drive is likewise only schematically indicated. The rotary drive 13 is in drive connection with the clamping device 11, so that the workpiece 4 may be rotated about the second axis 12, as indicated by an arrow 14 in FIG. 1.

In order to detect the angular deflection, and thus the particular angular position of the measuring probe 7, as a function of the particular rotational position of the workpiece 4 during the rotation about the axis 12, in the illustrated exemplary embodiment a digital angle measuring system 16 is provided which is in data transmission connection with a measured value memory 18, which is in data transmission connection with a downstream evaluation device 20 for reconstructing the contour of the workpiece 4 from the stored measured values.

The measuring probe 7 is adjustable in three dimensions relative to the workpiece 4 by means of a motorized adjustment device 22, which likewise is only schematically indicated in FIG. 1.

The operating principle of the measuring assembly according to the invention is as follows:

For measuring the contour of the workpiece 4, the measuring probe 8 is adjusted relative to the workpiece 4 by means of the adjustment device 22, so that the probe element 10 comes into radial contact with the surface of the workpiece 4 to be measured, and the measuring probe 7 thus contacts the workpiece 4. A desired probe force is then set by means of the adjustment device 22 or by separately provided means.

During the measurement, the workpiece 4 is rotated about the second axis, the probe arm 8 of the measuring probe 7 being deflected corresponding to the contour of the workpiece 4. During the rotation of the workpiece 4, the associated angular deflection of the probe arm 8 of the measuring probe 7 with respect to the particular rotational position of the workpiece 4 about the second axis 12 is detected by means of the angle measuring system 16, and the coordinate pair thus formed in each case is stored as a measured value in the measured value memory 18. The evaluation device 20 reconstructs the contour of the workpiece 4 based on these measured values. The manner in which this reconstruction takes place is generally known to those skilled in the art, and therefore is not explained here in greater detail.

The measuring assembly 2 according to the invention, with a simple and inexpensive design, allows the measurement of the contour of the workpiece 4. Since the measuring assembly 2 according to the invention is insensitive to misalignment of the axes 6, 12 relative to one another, which in the ideal case are parallel, a time-consuming alignment of the axes 6, 12 may be at least partially dispensed with, so that the overall time of the measurement is reduced and cost savings are thus achieved.

Figure 2:
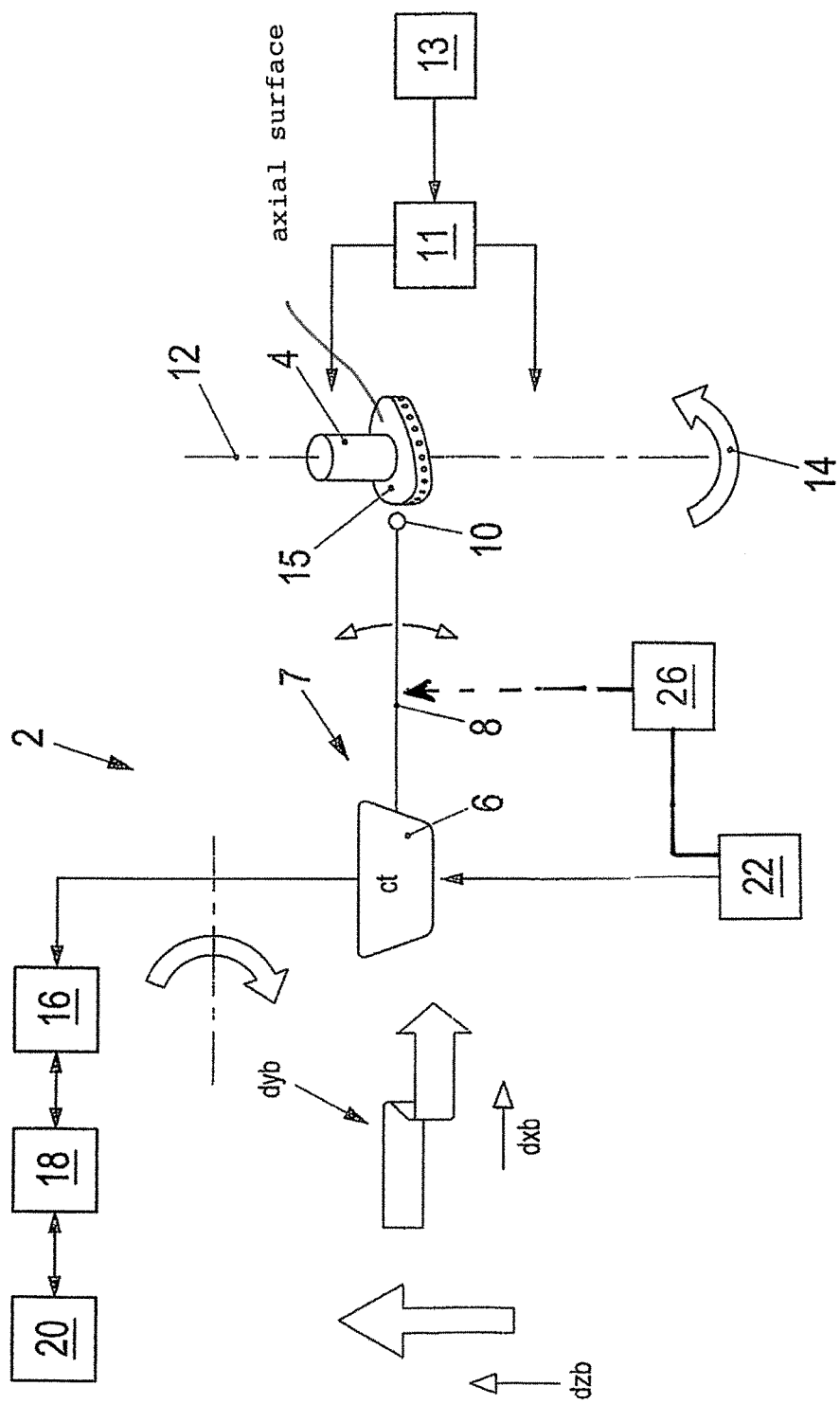
FIG. 2, in the same representation as FIG. 1, shows a second exemplary embodiment of a measuring assembly according to the invention.

FIG. 2 illustrates a second exemplary embodiment of a measuring assembly 2 according to the invention, which differs from the exemplary embodiment according to FIG. 1 in that the measuring axis (first axis 6) of the measuring probe 7, about which the probe arm 8 is pivotably supported, is perpendicular or approximately perpendicular to the second axis 12 (extending perpendicularly with respect to the plane of the drawing in FIG. 2), as illustrated in FIG. 2.

A surface 15 of the workpiece 4 that faces in the direction of the second axis 12, i.e., is axially directed, may be axially contacted in this way. That surface 15 may be termed an "axial surface" as shown in FIG. 2. While maintaining the advantages of the measuring assembly 2 according to the invention, the measurement is carried out in a manner corresponding to the exemplary embodiment according to FIG. 1, whereby, for example, runout characteristics of the contacted surface may be determined. In the second exemplary embodiment, the axes 6, 12 may be permanently oriented perpendicularly with respect to one another. However, it is also possible to convert the measuring assembly 2 according to FIG. 1 into the measuring assembly according to FIG. 2 by pivoting the measuring probe 7 by 90° by means of a pivot device 26 of the adjustment device 22. An arrow is provided which shows pivot device 26 that symbolizes that pivot device 26 acts on axis 6 to rotate axis 6 by 90°. The arrangement according to FIG. 1 then forms a first pivot position in which the axes 6, 12 are parallel to one another for radially contacting the workpiece 4, while the arrangement according to FIG. 2 forms a second pivot position in which the axes 6, 12 are perpendicular to one another for axially contacting the workpiece 4 on a "radial surface" as labelled in FIG. 1.

The subject matter of the invention further relates to a method for measuring the contour of a surface, in which the first axis and the second axis are situated relative to one another according to the invention.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

What is claimed is:

1. A measuring assembly for measuring the contour of a workpiece, comprising:
   a) a measuring probe that is pivotably supported and deflectable about a first axis in order to contact a surface of the workpiece;
   b) a second axis that is associated with the workpiece;
   c) the first axis and the second axis are substantially parallel to one another in a first position for radially contacting a radial surface of the workpiece;
   d) a means for rotating the measuring probe and the workpiece relative to one another are provided, such that in the first position the measuring probe contacts the radial surface of the workpiece during the rotation;
   e) a means for plotting the angular deflection of the measuring probe as a function of the rotational position of the workpiece relative to the measuring probe is provided;
   f) an adjustment device for adjusting the position of the measuring probe relative to the second axis is associated with the measuring probe; and
   g) the adjustment device includes a pivot device, associated with the first axis of the measuring probe, for pivoting the measuring probe by substantially 90° to a second pivot position, and in the second pivot position the first axis is substantially perpendicular to the second axis for axially contacting the measuring probe with an axial surface of the workpiece facing in the direction of the second axis.

2. The measuring assembly according to claim 1, wherein:
   a) a rotary drive is associated with the workpiece in order to rotate the workpiece about the second axis during the measurement.

3. The measuring assembly according to claim 2, wherein:
   a) the rotary drive is in drive connection with a holding device for holding the workpiece during the measurement.

4. The measuring assembly according to claim 3, wherein:
   a) the holding device includes a clamping device for clamping the workpiece.

5. The measuring assembly according to claim 1, wherein:
   a) the measuring probe includes a pivot lever that is pivotably supported about the first axis and on whose free end a probe element is situated.

6. The measuring assembly according to claim 5, wherein:
   a) the probe element is one of a sphere and a cylinder whose axis of symmetry is substantially perpendicular to the first axis and a longitudinal direction of the pivot lever.

7. The measuring assembly according to claim 1, wherein:
   a) a digital angle measuring system for detecting the angular position of the measuring probe is associated with the measuring probe.

8. The measuring assembly according to claim 1, wherein:
   a) means for setting a probe force for contacting the workpiece, using the measuring probe, is provided.

9. The measuring assembly according to claim 1, wherein:
a) a measured value memory is provided for storing measured values that are formed by the particular angular deflection of the measuring probe as a function of the rotational position of the workpiece relative to the measuring probe, the measured value memory being in data transmission connection with an evaluation device in order to reconstruct the contour of the workpiece from the stored measured values.

10. The measuring assembly according to claim 1, wherein:
a) the adjustment device adjusts the position of the measuring probe relative to the second axis for contacting the workpiece.

\* \* \* \* \*